US006407531B1

United States Patent
Walters et al.

(10) Patent No.: US 6,407,531 B1
(45) Date of Patent: Jun. 18, 2002

(54) METHOD AND SYSTEM FOR CONTROLLING A SYNCHRONOUS MACHINE OVER FULL OPERATING RANGE

(75) Inventors: James E. Walters, Carmel; Fani S. Gunawan; Yanhong Xue, both of Westfield, all of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/757,187

(22) Filed: Jan. 9, 2001

(51) Int. Cl.$^7$ ................................................. H02P 7/00
(52) U.S. Cl. ....................................... 318/805; 318/807
(58) Field of Search ............................. 318/798–812, 318/432, 433

(56) References Cited

U.S. PATENT DOCUMENTS

| | | |
|---|---|---|
| 3,590,352 A | 6/1971 | Ries et al. |
| 3,656,038 A | 4/1972 | Ries et al. |
| 3,735,226 A | 5/1973 | Pittner |
| 4,090,119 A | 5/1978 | Griffith et al. |
| 4,131,832 A | 12/1978 | Cavil et al. |
| 4,206,389 A | 6/1980 | Snyder |
| 4,260,937 A | 4/1981 | Cavil et al. |
| 4,264,846 A | 4/1981 | Sauer et al. |
| 4,385,266 A | 5/1983 | Sloan |
| 4,675,585 A | 6/1987 | Krueger et al. |
| 4,677,360 A | 6/1987 | Garces |
| 4,968,925 A | 11/1990 | De Doncker |
| 5,032,771 A | 7/1991 | Kerkman et al. |
| 5,339,012 A | 8/1994 | Schroedl et al. |
| 5,455,473 A | 10/1995 | Lipo et al. |
| 5,569,995 A | 10/1996 | Kusaka et al. |
| 5,825,113 A | 10/1998 | Lipo et al. |
| 6,008,614 A | 12/1999 | Imai |
| 6,014,006 A * | 1/2000 | Stuntz et al. ................ 318/804 |

OTHER PUBLICATIONS

Yanhong Xue et al, "A Propulsion Control for a Hybrid Electric Vehicle with an Adaptive Efficiency Mechanism", Symposium—16 Intl. Electric Vehicle; Oct. 13–16, 1999.
G.C.D. Sousa et al, "Fuzzy Logic Based On–Line Efficiency Optimization Control of an Indirect Vector Controlled Induction Motor Drive"; IEEE/IECON Conf., 1993.
Sang–Hoon Kim et al, "Maximum Torque Control of an Induction Machine in the Field Weakening Region": IEEE Transactions on Industry Applications, vol. IA–31, 1995.
Proposed S/A Control Strategy; Annual Review Meeting; University of Wisconsin at Madison; Mar. 29–30, 2000; PMAC Optimal Efficiency Control.
Sang–Hoon Kim et al, "Voltage Control Strategy for Maximum Torque Operation of an Induction Machine in the Field–Weakening Region"; IEEE Transactions on Industry Applications; vol. 44 No. 4, 1997.

* cited by examiner

*Primary Examiner*—Khanh Dang
(74) *Attorney, Agent, or Firm*—Margaret A. Dobrowitsky

(57) ABSTRACT

System and method for controlling a synchronous machine are provided. The method allows for calculating a stator voltage index. The method further allows for relating the magnitude of the stator voltage index against a threshold voltage value. An offset signal is generated based on the results of the relating step. A respective state of operation of the machine is determined. The offset signal is processed based on the respective state of the machine.

28 Claims, 5 Drawing Sheets

METHOD AND SYSTEM FOR CONTROLLING A SYNCHRONOUS MACHINE OVER FULL OPERATING RANGE

This invention was made with U.S. Government support through Definitized Subcontract C-HEV-5A under MRI/ CHRYSLER LETTER SUBCONTRACT NO. ZAN-6-16334-01, which subcontract was in turn issued under MRI/CHRYSLER PRIME CONTRACT NO. DE-AC36-83CH10093" awarded by the Department of Energy, and, in accordance with the terms set forth in said contracts, the U.S. Government may have certain rights in the invention.

BACKGROUND OF THE INVENTION

In recent years the advent of modern power electronics has substantially changed the motor and controller hardware used in traction control and electric/hybrid vehicle drive applications. Historically, DC motors have been popular in such applications due to their linear torque response over a wide speed range to input current and their near independent torque and flux control. However, DC motors may exhibit lower efficiency, increased maintenance requirements and speed limitations imposed by the commutator and brushes.

The disadvantages of DC motors can be overcome by the use of synchronous machines in either the form of a permanent magnet (PMAC), wound-field or synchronous reluctance machine (SyR), in conjunction with an inverter. Synchronous machines are robust since they have no brushes or commutators and are capable of four quadrant operation when used with a variable frequency and variable voltage controller, such as a vector control technique. The use of vector control techniques allows the flux producing component and torque producing component of motor current to be decoupled to produce a motor response analogous to that of a DC motor. Vector control techniques of motor control may be computationally intensive and, when first developed, were not practical due to the lack of capability in the digital processing equipment to handle the required calculations. With the rapid advancement of smaller and faster processors, vector control techniques have become practical for control of synchronous machines.

Electric drive systems for an electric vehicle or a hybrid electric vehicle need to have a wide speed range, high torque per ampere, high efficiency, quick dynamic response, and robustness. Synchronous machines are widely considered for such applications due to the advantages mentioned previously. However, the design of such a high performance drive system is challenging because of the motor's nonlinear characteristics and its parameter variations due to temperature, magnetic saturation, or both. In addition, the variation of drive input values, such as battery voltage, can negatively affect the drive performance and can cause loss of motor control. The present invention allows for improved techniques for vector control and field weakening strategies to optimally control the machine over its entire operating range. Improvement in machine efficiency is an important objective for any electric or hybrid vehicle drive. In an actual electromechanical machine, e.g., motor, the efficiency is determined by various machine parameters, such as resistance and inductance, which are significantly affected by respective operational and/or environmental variables, such as machine temperature and commanded current levels. The machine performance and efficiency is also affected by the level of the voltage supplied to the drive which is determined by the voltage source, inverter and Pulse Width Modulation (PWM) strategy. Thus, the efficiency of a drive system is a complex function of the machine's characteristics, inverter's characteristics, and the selected modulation strategy, e.g., PWM. For a given motor and inverter, the control strategy is the primary means of improving the drive efficiency and controllability. By maintaining a high efficiency for the drive system, the energy required is minimized and the cooling system can realize cost savings.

PMAC machines can be designed to posses a significant field-weakened region. This design approach reduces the inverter size, by reducing the required current per phase which reduces the drive unit size and cost. The controller, however, must become more sophisticated in order to properly control the drive to maintain high efficiency and acceptable dynamic performance in the field-weakened range. The most efficient operation for a PMAC above its base speed is achieved when the smallest amount of current is used to weaken the magnetic flux of the magnet. This condition results in operation where the controller operates the machine near the voltage limit of the system. If the available voltage to the inverter is changed or the magnetic flux is varied due to temperature change, the amount of field-weakening current should be adjusted in order to maintain control and high efficiency. The control should also be modified from the traditional approach in order to increase the drive performance and improve stability for the voltage limited condition. The dynamics of the control may be of paramount importance since operation in the voltage limited condition could cause certain undesirable effects, such as voltage saturation, that can cause slow response or loss of machine control.

Synchronous reluctance machines can also be designed to have a significant field-weakened range. Unlike the PMAC, this machine does not have an already established field flux in the form of a magnet so the torque produced is from reluctance torque. In the field-weakened range, the torque and efficiency are limited by the available bus voltage. If the field can be increased without exceeding a voltage limit greater efficiency and higher torque can be produced from the machine at a given operation point. Thus, means for setting the flux as a function of operating conditions is desired. Presently known control strategies are believed to lack such control function.

Thus, there are two important issues in the control of synchronous machines: stability and efficiency. If too little current is used to weaken the field for a PMAC machine or, analogously, if too much flux current is used in a SyR machine, then control can be lost due to voltage limit conditions. In contrast, if too much current is provided in a PMAC machine or, analogously if too little flux current is used in a SyR machine, then the efficiency will be too low.

As suggested above, improvement in the efficiency of the synchronous machine is another very desirable feature in any electric or hybrid electric vehicle propulsion drive system. Unfortunately, the various parameters of even a carefully designed high-efficiency synchronous machine, such as mutual inductance, magnet flux strength (if applicable), etc., may drastically vary as a function of several operational conditions, such as frequency, excitation level, generated torque, rotor temperature, etc. Thus, the efficiency of a drive system and the required voltage to maintain an operating point is a complex function of a myriad of factors, such as the type of machine used, its parameter sensitivity, inverter topology, the selected modulation technique used for generating respective gate signals to trigger the inverter, etc.

Thus, in view of the foregoing considerations, it would be desirable to maintain the optimal efficiency and voltage control of the drive for the various loads where the drive system is designed to operate. The present invention recognizes that such optimal efficiency may be obtained by appropriately selecting the flux value to be used under varying load and/or torque conditions. In particular, it would be desirable to determine, experimentally and/or analytically, a set of optimal flux values under different speed and torque conditions. The experimentally or analytically-derived flux values could then be incorporated into a memory unit, e.g., a look-up table, to improve the overall efficiency of the drive system. It would be further desirable to make the foregoing technique for improving drive system efficiency substantially impervious to variations in battery voltage and operating temperature, parameter variations from machine to machine, as well as inaccuracies in the experimentally and/or analytically derived data. For example, due to such variations, the maximum efficiency may not be obtained at certain operating conditions, and could even lead to loss of control of the system, particularly in the field-weakening region. In order to improve the stability of the drive system, it would be desirable to provide an adaptive optimal efficiency control technique that, even in the presence of wide variation of battery voltage and machine temperature, would allow the propulsion system to provide both high efficiency and stability over the entire range of speed and torque expected to be encountered by the propulsion system.

BRIEF SUMMARY OF THE INVENTION

Generally speaking, the present invention fulfills the foregoing needs by providing in one exemplary embodiment thereof a method for controlling a synchronous machine. The method allows for calculating a stator voltage index. The method further allows for relating the magnitude of the stator voltage index against a threshold voltage value. An offset signal is generated based on the results of the relating step. A respective state of operation of the machine is determined. The offset signal is processed based on the respective state of the machine.

The present invention further fulfills the foregoing needs by providing in another exemplary embodiment thereof a method for controlling a synchronous machine. The method allows for calculating a stator voltage index. The method further allows for relating the magnitude of the stator voltage index against a threshold voltage value. A parameter value that corresponds to a direct component of a stator current command based on the results of the relating step is generated. This parameter value constitutes a first value of the component of stator current command.

Memory configured to supply a respective parameter value corresponding to the stator current command based on one or more operational signals of the machine is provided. This parameter value constitutes a second value of the component of stator current command. A respective state of operation of the machine is determined. A switching signal is generated based on the respective state of the machine. The switching signal is used for controlling which of the first and second parameter values of the component of stator current command is to be used for machine control.

In another aspect of the present invention, a system for controlling a synchronous machine is provided. The system includes a calculating module configured to calculate a stator voltage index. The system further includes a comparator configured to relate the magnitude of the stator voltage index against a threshold voltage value. A generating module is configured to generate an offset signal based on the results of the comparator. A determining module is configured to determine a respective state of operation of the machine. A processor is configured to process the offset signal based on the respective state of the machine.

In yet another aspect of the present invention, a system for controlling a synchronous machine includes a calculating module configured to calculate a stator voltage index. The system further includes a comparator configured to relate the magnitude of the stator voltage index against a threshold voltage value. A generating module is configured to generate a parameter value corresponding to a direct component of a stator current command based on the results of the relating module. This parameter value constitutes a first value of said component of stator current command. Memory is configured to store a respective parameter value corresponding to the stator current command based on one or more operational signals of the machine. This parameter value constitutes a second value of the component of stator current command. A determining module is configured to determine a respective state of operation of the machine. A switching control unit is configured to generate a switching signal based on the respective state of the machine. This switching signal is used for controlling which of the first and second parameter values of the component of stator current command is to be used for machine control.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

EXEMPLARY NOMENCLATURE $i_{qs}^{e}(i_{ds}^{e})$: q-axis (d-axis) component of stator current in synchronous reference frame.

$i_{\alpha s}^{s}(i_{\beta s}^{s})$: α-axis (β-axis) component of stator current in stationary reference frame.

$i_{as}^s(i_{bs}^s, i_{cs}^s)$: a-axis (b-axis, c-axis) component of stator current in stationary reference frame.

$v_{qs}^e(v_{ds}^e)$: q-axis (d-axis) component of stator voltage in synchronous reference frame.

$v_{\alpha s}^s(v_{\beta}^s)$: α-axis (β-axis) component of stator voltage in stationary reference frame.

$v_{as}^s(v_{bs}^s, v_{cs}^s)$ a-axis (b-axis, c-axis) component of stator voltage in stationary reference frame.

$V_{dc}$: DC bus voltage.

$V_{index}$: Magnitude of the applied machine voltage $V_{limit}$: Limit of the allowed voltage applied to the machine $V_{margin}$: A safety-margin value.

$V_{s\_max}$: Maximum output voltage inverter can provide in SVM.

$R_s$: Stator resistance.

$L_{ds}$: Stator D axis Inductance $L_{qs}$: Stator Q axis Inductance $\lambda_{qs}^e(\lambda_{ds}^e)$: q-axis (d-axis) stator flux vector in synchronous reference frame.

$\lambda_{qr}^e(\lambda_{dr}^e)$: q-axis (d-axis) rotor flux vector in synchronous reference frame.

$\omega_e(\omega_r)$: Excitation (rotor) electrical angular frequency.

$\theta_e(\theta_r)$: Excitation (rotor) electrical angle $T_e^*$: Torque reference of electric machine.

P: Number of poles.

Variable*: Variable reference.

$V_s^*$: Voltage vector reference.

Figure 1:
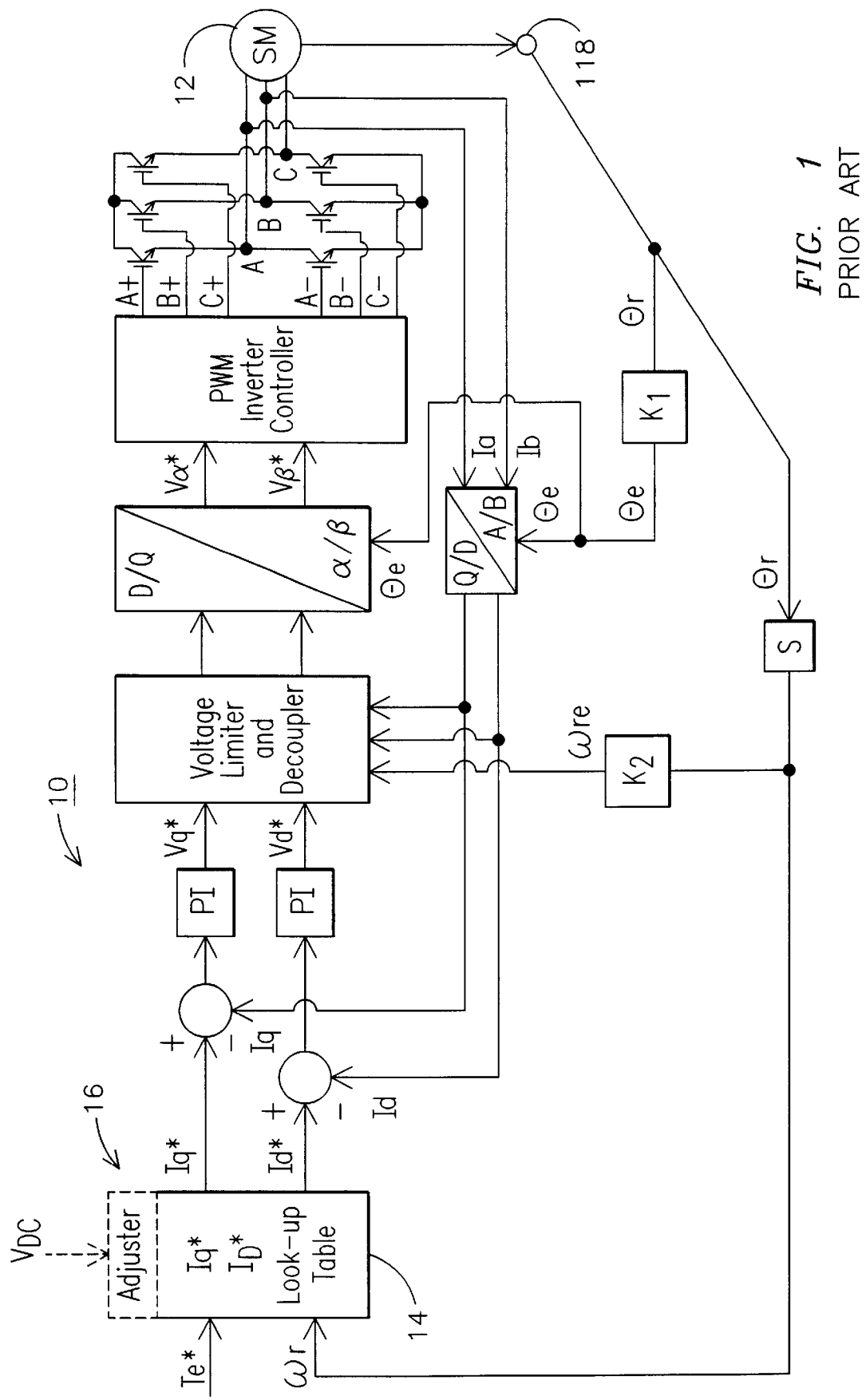
FIG. 1 illustrates a block diagram schematic of a prior art propulsion system.

For the purpose of better understanding the difficulties that are now overcome by the system and techniques of the present invention, two prior art techniques are respectively discussed below in the context of FIG. 1. More specifically, FIG. 1 illustrates an exemplary prior art propulsion system 10 configured to implement an rotor flux oriented (RFO) vector control technique using a PWM inverter. As suggested above, RFO vector control enables a synchronous machine 12 to be controlled in a similar way to a separately excited DC machine since the respective torque and flux components can be independently controlled. Hence it is conceptually straightforward for the flux level to be pre-programmed for different torque inputs and different speed conditions.

As can be appreciated from FIG. 1, a separate flux profile for different torque inputs and different speed conditions may be retrieved from a look-up table 14 to obtain the maximum efficiency for these different conditions. The flux reference values can thus be selectively adjusted as a function of rotor shaft speed and torque reference. In theory and under idealized conditions, this technique would allow the machine to be operated at optimum efficiencies over the entire speed range. Unfortunately, in practical implementations, this technique suffers from notable drawbacks due to variations in battery voltage and machine parameter variations caused by temperature changes encountered by the system during its operation.

As suggested above, due to such variations, the maximum efficiency may not be obtained at certain operating conditions, and could possibly lead to loss of control of the system, particularly in the field-weakening region. One known technique to solve such a problem is to determine the flux data under worst possible operational and/or environmental conditions. For instance, the flux data may be based on the lowest possible dc supply voltage and lowest possible machine temperature. It should be readily appreciated that this known technique can be prohibitively costly and time consuming and degrades the efficiency improvement in the field-weakening region. It can also require additional thermal cooling for the system in order to handle the higher losses caused by the lowered efficiency.

Adjuster module 16, shown in dashed lines, represents a prior art modification to the above-discussed system. In this case, the bus voltage $V_{DC}$ is measured and processed in adjuster module 16 in conjunction with the current commands for flux and torque from look-up table 14 to determine if such commands should be adjusted for voltage limitations or efficiency reasons. It will be appreciated that this modification is an open loop technique that fails to account for changing machine parameters or saturation effects. It merely helps to somewhat reduce the effect of bus voltage variations. Also, this technique will require the use of voltage sensing hardware which can include a shunt and an analog to digital converter. Thus, this prior art modification would not protect against variation of machine parameters and has the disadvantage of requiring additional sensing hardware, processing circuits and related wires. The additional circuits and connections also reduce the reliability of the drive system.

Figure 2:
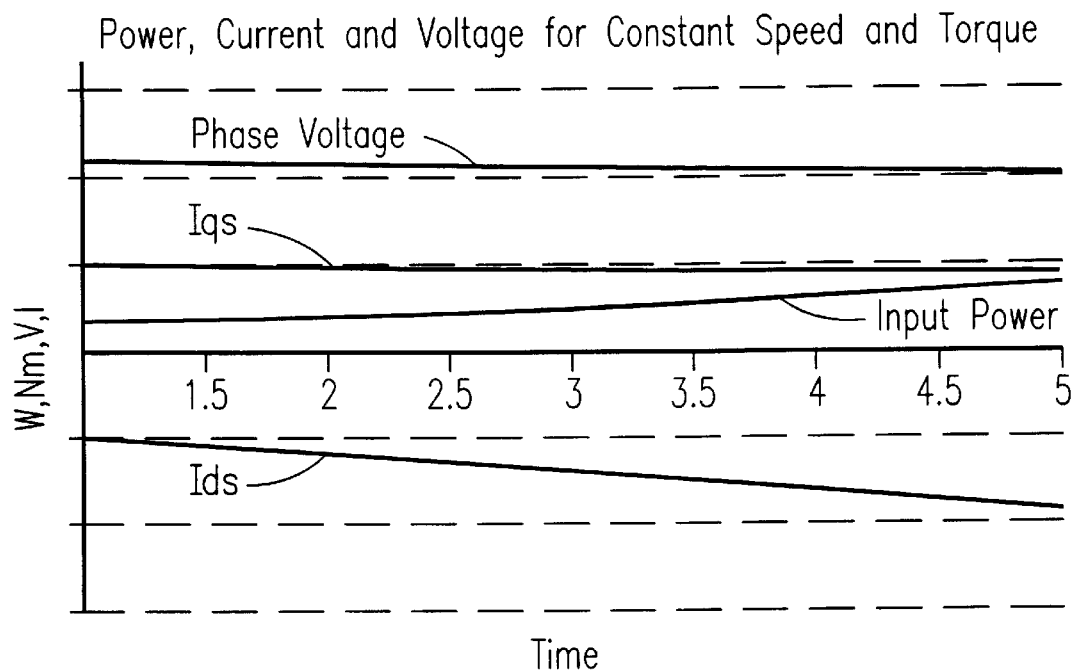
FIG. 2 shows a plot of exemplary parameters of a synchronous machine, which plot is used for facilitating understanding of the control system and method of the present invention.

FIG. 2 illustrates an exemplary plot that may be useful to better understand the principle of efficiency control of synchronous machines. The plot of FIG. 2 shows respective exemplary relationships among, input power, phase voltage, magnetizing component of the current, and torque-producing component of the current for a given output torque of a PMAC machine operating under fixed speed conditions. It will be appreciated from FIG. 2 that when the magnetizing current component magnitude is increased for PMAC and decreased for the SyR, then the torque-producing current component would need to be varied to keep the output torque constant due to the change of reluctance torque in the machine. For some types of PMAC drives the parameter variation or input voltage variations are small enough that the change in torque caused by adjusting the flux component of the current with the torque component fixed are negligible and can be performed without significant torque effects. In the context of this discussion, the optimal point of operation is seen to occur for the lowest amount of field-weakening current while the required phase voltage is seen to be at its highest value under this condition. The techniques discussed in the context of FIG. 1 are believed to fail to provide maximum efficiency at the entire range of operational and/or environmental conditions generally encountered by the propulsion system, and could even lead to instability of the system, particularly in the field-weakening region.

Figure 3:
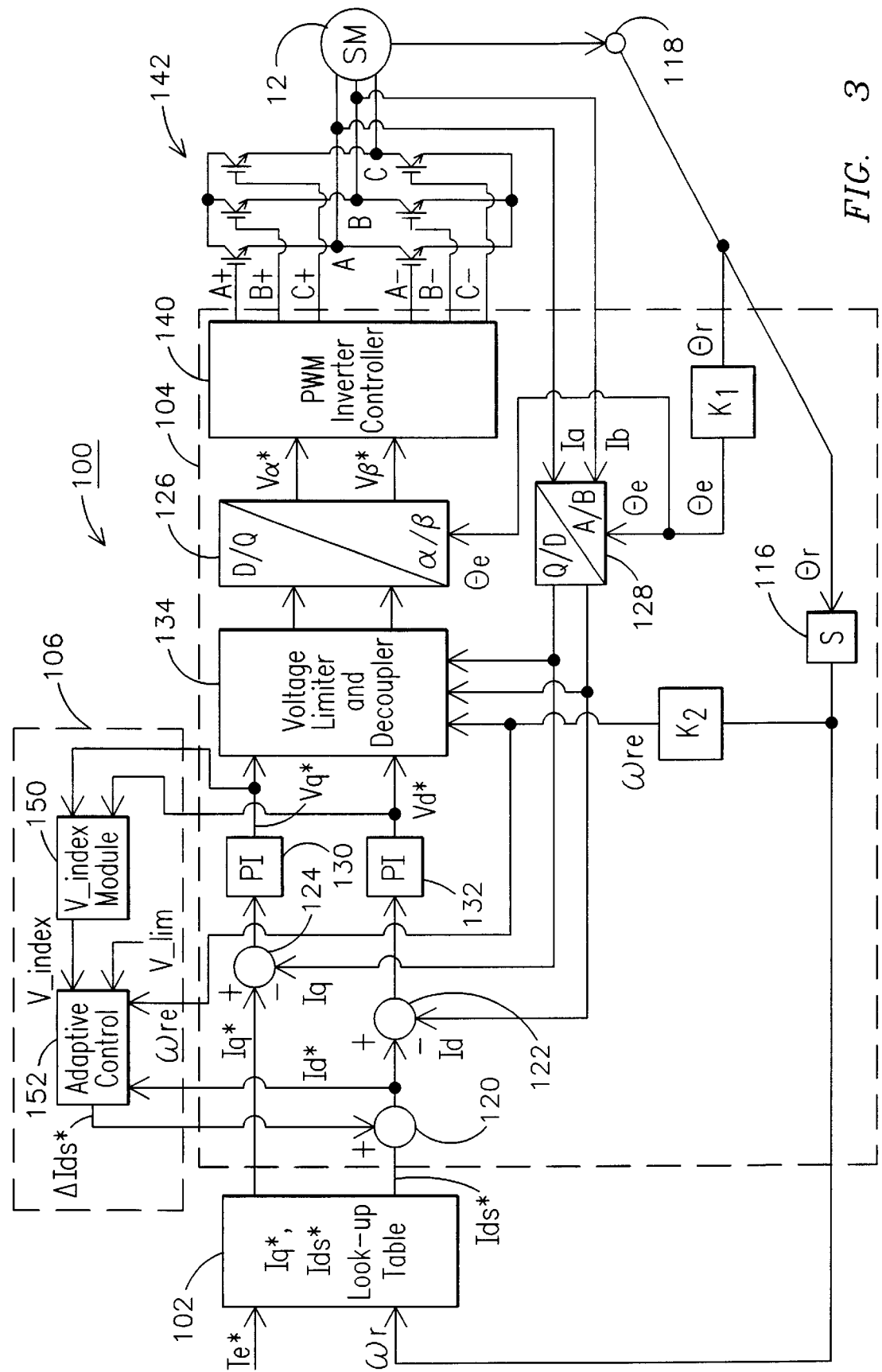
FIG. 3 illustrates a block diagram schematic of an exemplary field vector control system that benefits from an adaptive control module that embodies one aspect of the present invention.

FIG. 3 shows one exemplary embodiment of the adaptive optimum efficiency control system 100 of the present invention, which for the purposes of analysis and description of its functional interrelationships may be subdivided into three main modules, a compensation look-up table 102, a vector control module 104, and an adaptive control module 106. As shown in FIG. 3, the d axis current reference ($I_{ds}^*$) and the q axis current reference ($I_{qs}^*$) may be adjusted as a function of commanded torque $T_e^*$ and rotor speed $\omega_r$ using analytically and/or experimentally derived flux-adjusting values stored in look-up table 102 that may comprise a two-dimensional look-up table responsive to two respective inputs to supply two outputs. Look-up table 102 is configured to provide optimum efficiency control for the ideal case by adjusting the value of the d axis current reference ($I_{ds}^*$) and the q axis current reference ($I_{qs}^*$) as a function of commanded torque $T_e^*$ and rotor speed $\omega_r$. The value of the torque reference signal $T_e^*$ may be externally-derived by a system master controller or may correspond to the torque value commanded by an operator through a suitable machine propulsion throttle handle. The value of the rotor speed signal $\omega_r$ may be derived from a rotor angle value ($\theta r$), upon execution of a mathematical differentiation operation by a differentiator 116 which receives a signal θr indicative of rotor shaft angle, such as may be generated by a shaft encoder 118.

The d axis current reference, ($I_{ds}$*) and an output signal ($\Delta I_{ds}$*) from adaptive control module 106 is each respectively applied to a summer 120 to generate an adjusted d axis current reference signal, (Id*) which is further processed by a subtractor 122 that receives a feedback current signal Id. It will be understood that the subtracting operation respectively executed by subtractor 122 and other such devices described below may be executed by a summer having one inverting input terminal and one non-inverting input terminal. It will be further understood that any of the various arithmetic and logical operations in system 100 may be conducted through respective software modules as may be executed in a suitable microprocessor and such operations need not be executed through hardware modules. It will be appreciated that the difference output signal from subtractor 122 represents an error signal between the adjusted d axis current reference signal (Id*) and the feedback current signal Id.

As suggested above, one of the outputs of look-up table 102 is the torque-producing current component reference (Iq*), which is processed by a subtractor 124 that receives a feedback current Iq. In this case, the difference output signal from subtractor 124 represents an error signal between the torque current component reference signal (Iq*) and the feedback current signal Iq. It will be appreciated that look-up table 102 allows for compensating the non-linear torque characteristics of the synchronous machine so as to generate a substantially linear torque response.

By way of example and not of limitation, vector control module 104 may comprise a standard RFO vector control system, including respective voltage and current transformation units 126 and 128, two proportional plus integral (PI) current regulators 130 and 132, a voltage limiter and decoupler module 134, each using techniques well-understood by those skilled in the art. For readers who desire further background regarding vector control techniques, reference is made to Chapters 5 and 6 of a textbook by D. W. Novotny and T. A. Lipo, titled "Vector Control and Dynamics of AC Drives", published by Oxford University Press, 1996, which textbook is herein incorporated by reference. Current transformation unit 128 converts the three-phase currents in the stationary frame into equivalent two-phase orthogonal currents in the synchronous frame according to the following equations:

$$i_{\alpha s}=i_{as}$$

$$i_{\beta s} = \frac{-\sqrt{3}}{3} *(i_{as} + 2 * i_{bs})$$

$$i_{ds}=i_{\alpha s}*\cos\theta_e - i_{\beta s}*\sin\theta_e$$

$$i_{qs}=i_{\alpha s}*\sin\theta_e + i_{\beta s}*\cos\theta$$

After the transformation is executed, the two orthogonal current signals $I_q$ and $I_d$ in the synchronous frame are respectively applied to the two PI current regulators 130 and 132 as current feedback signals through subtractors 124 and 122.

The differences between the two orthogonal references and feedback signals then are calculated through the respective equations below:

$$v_{qs-controller}^{*}=k_{qp}*(i_{qs}^{*}-i_{qs})+k_{qi}*\int(i_{qs}^{*}-i_{qs})*dt$$

$$v_{ds-controller}^{*}=K_{dp}*(i_{ds}^{*}-i_{ds})+K_{di}*\int(i_{ds}^{*}-i_{ds})*dt$$

The respective outputs of PI regulators 130 and 132 are supplied to voltage decoupling module 134 that removes the effect of cross-coupled flux effects.

Exemplary decoupling equations are:

$$v_{qs}^{*}=v_{qs-controller}^{*}+\omega_e \lambda_{ds}^{e}$$

$$v_{ds}^{*}=v_{ds-controller}^{*}-\omega_e \lambda_{qs}^{e}$$

where the flux is expressed as:

$$\lambda_{qs}=L_{qs}I_{qs}$$

$$\lambda_{ds}=\lambda_{magnet}+L_{ds}I_{ds}$$

The output signals from the voltage limiter and decoupler module 134 are then provided to voltage transformation unit 126 and are converted into equivalent two-phase voltage references in the stationary frame from the following equations:

$$v_{\alpha s}^{*}=v_{ds}^{*}*\cos\theta_e - v_{qs}^{*}*\sin\theta_e$$

$$v_{\beta s}^{*}=v_{ds}^{*}*\sin\theta_e + v_{qs}^{*}*\cos\theta_e$$

Each respective output signal of voltage transformation unit 126 is then applied to a PWM inverter controller 140 that in one exemplary embodiment may comprise an overmodulation space vector PWM unit to generate three respective duty cycle values. It will be appreciated that the controller functionality is analogous to having six synchronous timers for respectively generating six-gate pulse signals to the respective gate drive circuits of an inverter 142 that energizes synchronous machine 12. It will be further appreciated that the inverter will appropriately switch on and off according to the voltage levels of the gate signals from the controller in order to control operation of the synchronous machine.

$$|v_s^{*}|=\sqrt{(v_{ds}^{*})^2+(v_{qs}^{*})^2}$$

In one exemplary embodiment, respective modules 150 and 152 are configured for executing the adaptive control technique of the present invention. In particular, calculating module 150 allows for executing a voltage index calculation and module 152 allows for executing adaptive control as further described below. The voltage index calculation module 150 receives as its input terminals the respective orthogonal outputs of the two synchronous PI current regulators 130 and 132 The magnitude of these two orthogonal signals, called the modulation or voltage index, is calculated using the following equation:

$$|v_s^{*}|=\sqrt{(v_{ds}^{*})^2+(v_{qs}^{*})^2}$$

The voltage index value computed based on the foregoing equation is then applied to adaptive control module 152. As suggested above, the output of control module 152 is used to modify the value of the d-axis current reference signal to ensure stable operation of the propulsion system even under demanding operational and/or environmental conditions.

In general, the maximum output voltage in the SVM mode $V_{smax}$, which the inverter can provide to the machine, is limited by the available dc bus voltage $V_{dc}$ and the specific PWM control strategy used to trigger the respective inverter gating signals. If the maximum output line to line rms voltage is 0.707 percent of dc voltage, and further if the $V_{smax}$ is defined as phase peak voltage, then:

$$V_{smax} = \frac{\sqrt{2}}{\sqrt{3}} \cdot 0.707 \cdot V_{dc} = K_v \cdot V_{dc}/2 \qquad (2)$$

where, $K_{84}$ is maximum output voltage index and equals to 1.15.

Figure 4:
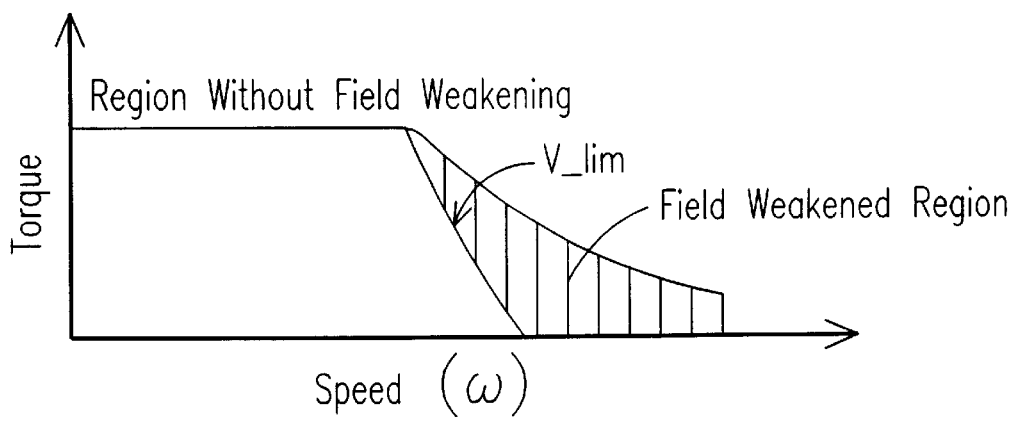
FIG. 4 shows a plot of respective regions used for controlling the synchronous machine, which plot is used for facilitating understanding of the control system and method of the present invention.

When the synchronous machine is operated in a field-weakening region, an example of which is shown in FIG. 4, the machine voltage equations of a rotor flux oriented control are given by:

$$v_{qs}^e = r_s \cdot i_{qs}^e + p\lambda_{qs}^e + \omega_e \cdot \lambda_{ds}^e$$

$$v_{ds}^e = r_s \cdot i_{ds}^e + p\lambda_{ds}^e - \omega_e \cdot \lambda_{qs}^e \qquad (3)$$

In order to ensure stable operation, the following constraint should be considered:

$$\sqrt{(v_{qs}^e)^2 + (v_{ds}^e)^2} \leq V_{smax} - V_{margin} = K_v \cdot V_{dc}/2 - V_{margin} \qquad (4)$$

In the field-weakened condition the predominant voltage drop is caused by the EMF terms. If stator resistance is ignored and steady state conditions are assumed then the applied voltage for a PMAC machine is:

$$v_{qs}^e = \omega_e \lambda_{ds}^e$$

$$v_{ds}^e = -\omega_e \lambda_{qs}^e$$

where:

$$\lambda_{qs}^e = L_{qs} I_{qs}^e$$

$$\lambda_{ds}^e = \lambda_{magnet} + L_{ds} I_{ds}^e$$

Thus, assuming the q axis current is not changed and only the d axis current is varied to weaken the field, then more voltage will be available to the system.

Figure 5:
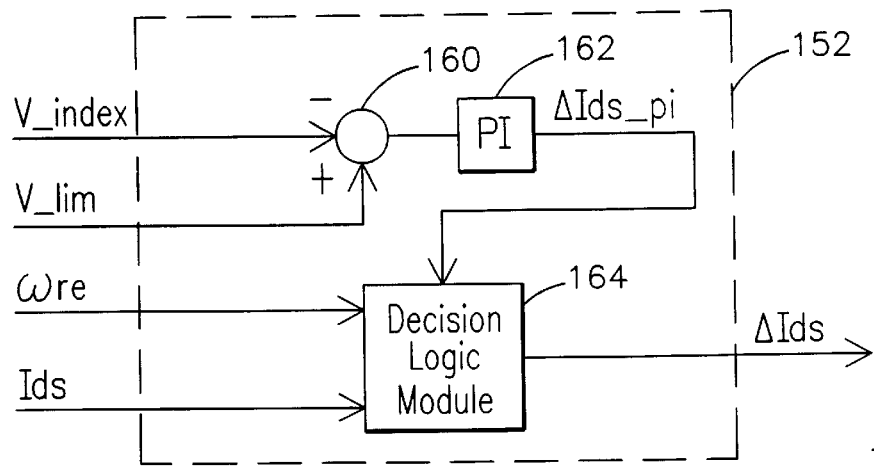
FIG. 5 illustrates further details regarding the control module of FIG. 3.

As better appreciated in FIG. 5, the magnitude (V_index) of the two orthogonal signals, Vq* and Vd*, which is calculated in calculating module 150 (FIG. 3), is compared or related in module 152, using a comparator 160, to a predetermined voltage threshold value ($V_{13}$ lim) and the output signal from comparator 160 is then coupled to a suitable controller, such as a PI controller 162. For example, if the dc bus voltage is reduced, then the voltage index amplitude will be increased above the predetermined threshold value, that is, the required output of the inverter would be above the predetermined threshold value. Controller 162 may be designed to have the dynamic properties mentioned previously so that an appropriate value of an offset signal ($\Delta I_{ds\_pi}$) can be generated and, thus the rotor flux value, under appropriate conditions as determined by a decision logic module 164, would be reduced so that the voltage index magnitude would be reduced to be within the predetermined threshold value. Thus, the output voltage of the inverter would be kept within the threshold voltage that insures stable operation and optimum efficiency. Conversely, if the voltage index magnitude is less than or equal to the predetermined threshold value, then the value of the output signal ($\Delta I_{ds\_pi}$) of controller 162 would be increased until the threshold value is attained assuming that the machine is in the field-weakened range. Thus, the back EMF would be kept within acceptable design limits and the drive system would be operated at the highest possible efficiency consistent with the voltage limit.

Figure 6:
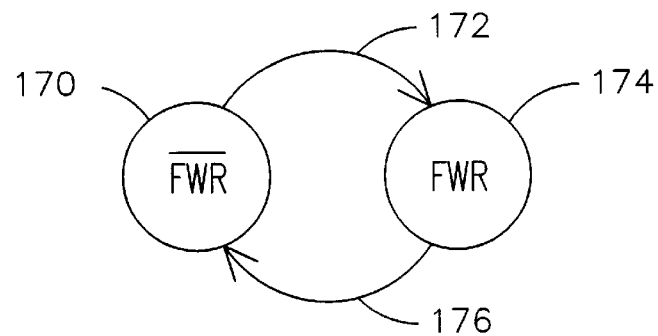
FIG. 6 is an exemplary state and state transition diagram as may be executed by the control module of FIG. 5.

FIG. 6 is a state diagram as may be executed by decision logic module 164 (FIG. 5). Module 164 allows for determining a respective state of operation of the machine and then processes offset signal $\Delta I_{ds\_pi}$ based on the state of the machine. It will be described below that under certain conditions, the full value of the generated offset signal $\Delta I_{ds\_pi}$ is applied to adjust the value of a direct component of stator current command. It will be further described that under other conditions the value of the generated offset signal $\Delta I_{ds\_pi}$ is set to a sufficiently small value (e.g., zero) to leave the value of the direct component of the stator current command substantially unchanged. To account for the fact that under some conditions the signal output from module 164 is set to a value different than that of offset signal $\Delta I_{ds\_pi}$, the output signal from module 164 is labeled in FIG. 5 as $\Delta I_{ds}$. Again, this labeling should facilitate the reader's understanding that in some instances the respective output signals from modules 162 and 164 will not be equal to one another.

As shown in FIG. 6, state 170 represents machine control in a region without field weakening (NFWR). A state transition 172 allows for transitioning to a state 174 (FWR) wherein the machine is controlled in a region with field weakening. FIG. 4 illustrates respective exemplary regions with and without field weakening. A state transition 176 allows for transitioning back to state 170. In one exemplary embodiment, assuming offset signal $\Delta I_{ds\_pi}$ has a positive value in state 170, then signal $\Delta I_{ds\_pi}$ would be set to a small value, e.g., zero, e.g., the value of signal $\Delta I_{ds}$ would take a value equal to zero or any sufficiently small value. In this exemplary embodiment, assuming the machine is in state transition 172, and further assuming the offset signal $\Delta I_{ds\_pi}$ has a negative value and $\omega_{re}$ is above a predefined minimum value, then logic module 164 would output the full value of the offset signal, e.g., signal $\Delta I_{ds\_pi}$ would have the same value as signal $\Delta I_{ds}$. Similarly, once in state 174, logic module 106 would continue to output the value of $\Delta I_{ds\_pi}$ signal. In state transition 176, assuming the sum of Id* plus $\Delta I_{ds\_pi}$ is above a predefined value which can be either a constant or set as a function of torque command, and $\omega_{re}$ is less than a maximum value, then $\Delta I_{ds\_pi}$ would be set to zero.

Figure 7:
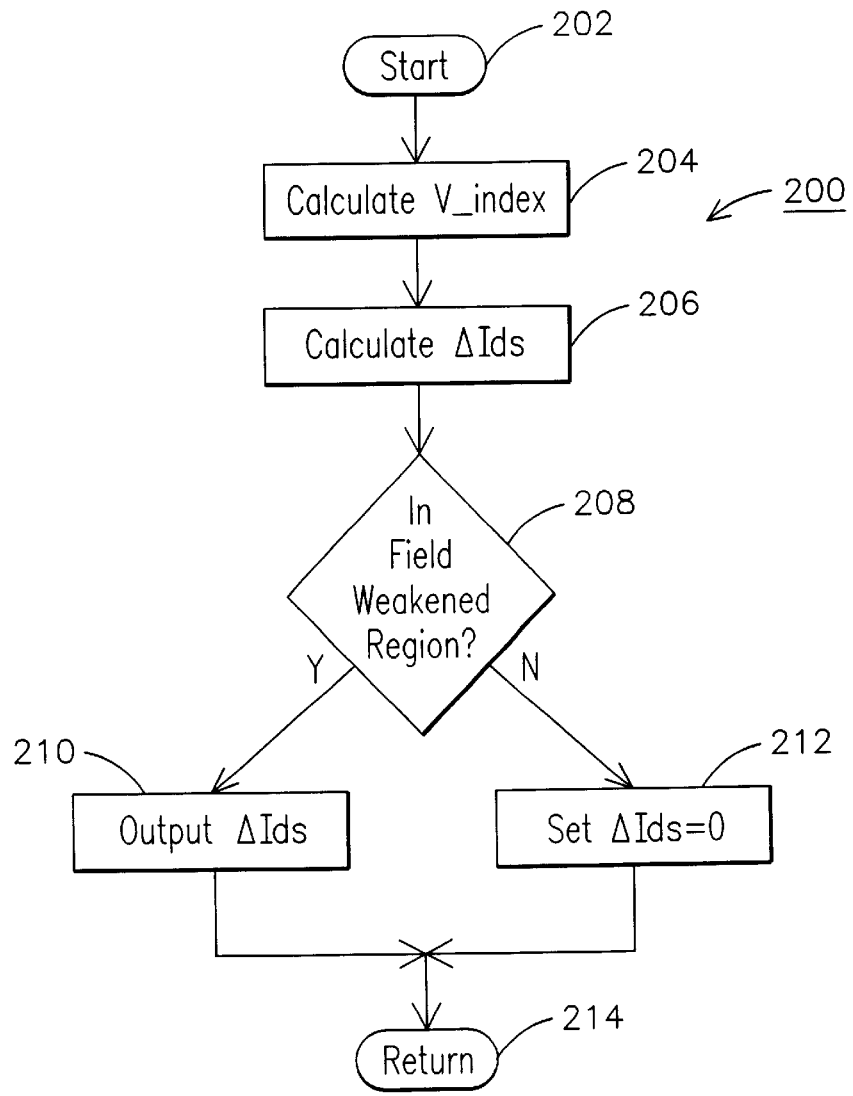
FIG. 7 is a flow chart illustrating exemplary steps that may be executed with the control module of FIGS. 3 and 5.

FIG. 7 shows an exemplary flow chart 200 as may be executed by decision logic module 164. Subsequent to start step 202, step 204 allows for calculating the V_index value, such as may be calculated by calculator module 150 (FIG. 3). Step 206 allows for calculating the value of the $\Delta I_{ds}$ signal, such as may calculated by control module 152. Step 208 allows for determining a respective control state of the machine, such as state 170 without field weakening or state 174 with field weakening. As suggested above, step 208 further allows for determining whether the machine is transitioning from state 170 to state 174 and vice versa. Prior to return step 214, step 210 allows for outputting the offset signal $\Delta I_{ds}$, or for setting the value of $\Delta I_{ds}$ to zero, depending on the respective present state of the machine or the respective state transition that may be occurring.

Figure 8:
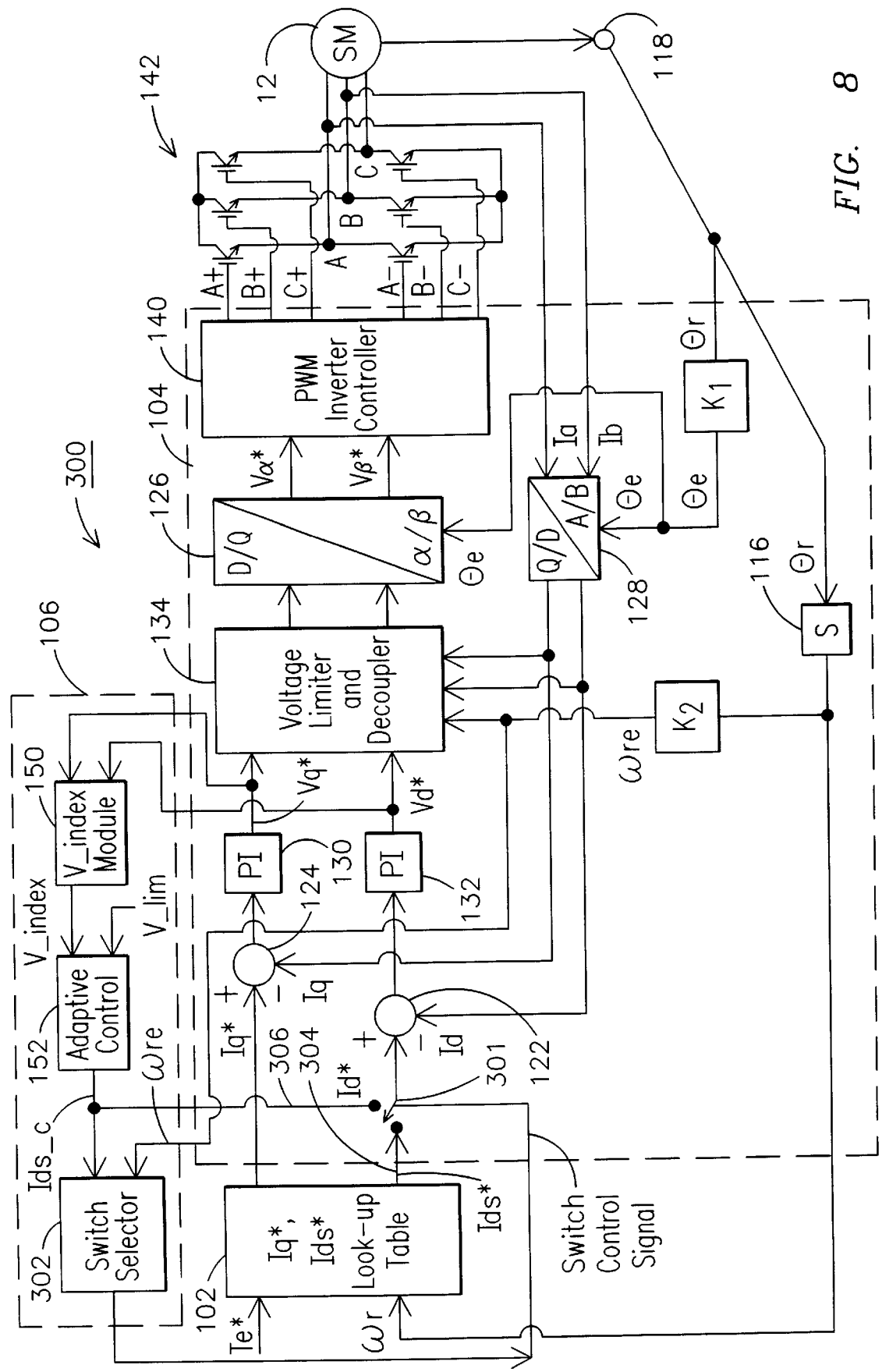
FIG. 8 illustrates a block diagram schematic of another exemplary embodiment of the adaptive control module that embodies another aspect of the present invention.

FIG. 8 shows another exemplary embodiment of the adaptive optimum efficiency control system 300 that may be suitable for applications with relatively slow changes in the torque command signal. For the sake of avoiding redundancy, functionality of any modules previously discussed will not be repeated. As shown in FIG. 8, a switch 301 is responsive to a switching signal supplied by switch selector 302. During a field-weakened state, switch 301 is set to be connected to terminal 306 to receive a parameter value corresponding to the direct component of stator current command as computed in adaptive control 152. This parameter value denoted as Ids_c constitutes a first value of the component of stator current command and, as described above, is based on relating the magnitude of the voltage index against the threshold voltage value. During a non-field-weakened state, switch 301 is set to be connected to terminal 304 to receive a parameter value stored in look-up table 102 that corresponds to the stator current command based on one or more operational signals of the machine, such as commanded torque $T_e^*$ and rotor speed $\omega_r$. This parameter value denoted as $I_{ds}^*$ constitutes a second value of the component of stator current command.

As suggested above, once a respective state of operation of the machine is determined, switch selector 302 generates a switching signal used for controlling which of the first and second parameter values of the component of stator current command is actually used for machine control. It will be appreciated that the techniques for determining whether the machine is operating either in a field-weakened state, or in a non-field-weakened state are as discussed in the context of FIG. 6 and will not be repeated.

In operation, switch 301 is responsive to the switching signal to pass one of the first and second parameter values based on the respective state of the machine. More particularly, the first parameter value from module 152 is passed through switch 301 from terminal 306 in the presence of the field-weakened state. Conversely, the second parameter value from look-up table 102 is passed through switch 301 from terminal 304 while in the non-field-weakened state. The embodiment of FIG. 8, may be conceptually viewed as a hybrid that relies on stored values on the look-up table during the non-field-weakened state, and uses the adaptive techniques discussed in the context of FIGS. 3–7 during the field-weakened state.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling a synchronous machine, the method comprising:
 calculating a stator voltage index;
 relating the magnitude of the stator voltage index against a threshold voltage value;
 generating an offset signal based on the results of the relating step;
 determining a respective state of operation of the machine; and
 processing the offset signal based on the respective state of the machine.

2. The method of claim 1 wherein the determining step comprises determining the presence of a field-weakened state, or the presence of a non-field-weakened state.

3. The method of claim 2 wherein the processing step comprises applying the value of any generated offset signal to adjust the value of a direct component of a stator current command when the determining step indicates the presence of the field-weakened state.

4. The method of claim 3 wherein the processing step comprises setting the value of any generated offset signal to a sufficiently small value to leave the value of the direct component of the stator current command substantially unchanged when the determining step indicates the presence of the non-field-weakened state.

5. The method of claim 2 wherein the determining step comprises determining transitioning from the non-field-weakened state to the field-weakened state.

6. The method of claim 5 wherein the processing step comprises applying the value of any generated offset signal to adjust the value of a direct component of a stator current command when the determining step indicates the presence of said state transition.

7. The method of claim 5 wherein the determining step comprises determining transitioning from the field-weakened state to the non-field-weakened state.

8. The method of claim 7 wherein the processing step comprises setting the value of any generated offset signal to a sufficiently small value to leave the value of the direct component of the stator current command substantially unchanged when the determining step indicates the presence of said state transition.

9. A method for controlling a synchronous machine, the method comprising:
 calculating a stator voltage index;
 relating the magnitude of the stator voltage index against a threshold voltage value;
 generating a parameter value corresponding to a direct component of a stator current command based on the results of the relating step, said parameter value constituting a first value of said component of stator current command;
 providing memory configured to store a respective parameter value corresponding to the stator current command based on one or more operational signals of the machine, said parameter value constituting a second value of said component of stator current command;
 determining a respective state of operation of the machine; and
 generating a switching signal based on the respective state of the machine, said switching signal used for controlling which of the first and second parameter values of said component of stator current command is to be used for machine control.

10. The method of claim 9 wherein the determining step comprises determining the presence of a field-weakened state, or the presence of a non-field-weakened state.

11. The method of claim 10 further comprising providing a switch responsive to the switching signal to pass one of the first and second parameter values based on the respective state of the machine.

12. The method of claim 11 wherein the first parameter value is passed when the determining step indicates the presence of the field-weakened state.

13. The method of claim 11 wherein the second parameter value is passed when the determining step indicates the presence of the non-field-weakened state.

14. The method of claim 9 wherein the one or more operational signals comprise a torque command signal and rotor speed signal.

15. A system for controlling a synchronous machine, the system comprising:

a calculating module configured to calculate a stator voltage index;

a comparator configured to relate the magnitude of the stator voltage index against a threshold voltage value;

a generating module configured to generate an offset signal based on the results of the comparator;

a determining module configured to determine a respective state of operation of the machine; and a processor configured to process the offset signal based on the respective state of the machine.

16. The system of claim 15 wherein the determining module is configured to determine the presence of a field-weakened state, or the presence of a non-field-weakened state.

17. The system of claim 16 wherein the processor is configured to apply the value of any generated offset signal to adjust the value of a direct component of a stator current command when the determining module indicates the presence of the field-weakened state.

18. The system of claim 17 wherein the processor is configured to set the value of any generated offset signal to a sufficiently small value to leave the value of the direct component of the stator current command substantially unchanged when the determining module indicates the presence of the non-field-weakened state.

19. The system of claim 16 wherein the determining module is further configured to determine transitioning from the non-field-weakened state to the field-weakened state.

20. The system of claim 19 wherein the processor is further configured to apply the value of any generated offset signal to adjust the value of a direct component of a stator current command when the determining step indicates the presence of said state transition.

21. The system of claim 19 wherein the determining module is further configured to determine transitioning from the field-weakened state to the non-field-weakened state.

22. The system of claim 21 wherein the processor is further configured to set the value of any generated offset signal to a sufficiently small value to leave the value of the direct component of the stator current command substantially unchanged when the determining module indicates the presence of said state transition.

23. A system for controlling a synchronous machine, the system comprising:

a calculating module configured to calculate a stator voltage index;

a comparator configured to relate the magnitude of the stator voltage index against a threshold voltage value;

a generating module configured to generate a parameter value corresponding to a direct component of a stator current command based on the results of the relating module, said parameter value constituting a first value of said component of stator current command;

memory configured to store a respective parameter value corresponding to the stator current command based on one or more operational signals of the machine, said parameter value constituting a second value of said component of stator current command;

a determining module configured to determine a respective state of operation of the machine; and a switching control unit configured to generate a switching signal based on the respective state of the machine, said switching signal used for controlling which of the first and second parameter values of said component of stator current command is to be used for machine control.

24. The system of claim 23 wherein the determining module is configured to determine the presence of a field-weakened state, or the presence of a non-field-weakened state.

25. The system of claim 23 further comprising a switch responsive to the switching signal to pass one of the first and second parameter values based on the respective state of the machine.

26. The system of claim 25 wherein the first parameter value is passed when the determining module indicates the presence of the field-weakened state.

27. The method of claim 25 wherein the second parameter value is passed when the determining module indicates the presence of the non-field-weakened state.

28. The system of claim 23 wherein the one or more operational signals comprise a torque command signal and a rotor speed signal.

* * * * *